United States Patent [19]
Hessing et al.

[11] Patent Number: 5,315,456
[45] Date of Patent: May 24, 1994

[54] PROGRAMMABLE SERVO TIMING GENERATOR

[75] Inventors: Charles E. Hessing; Boyd N. Shelton; Robert K. Barnes, all of Boise, Id.

[73] Assignee: Hewlett-Packard Company, Palo Alto, Calif.

[21] Appl. No.: 869,603

[22] Filed: Apr. 16, 1992

[51] Int. Cl.⁵ .............................................. G11B 5/596
[52] U.S. Cl. ................................................. 360/77.08
[58] Field of Search ......................... 360/77.07, 77.08

[56] References Cited

U.S. PATENT DOCUMENTS

| | | | |
|---|---|---|---|
| 4,516,177 | 5/1985 | Moon et al. | 360/77.08 |
| 4,737,869 | 4/1988 | Sugaya et al. | 360/77.08 |
| 4,869,240 | 1/1990 | Moriya et al. | 360/77.08 |
| 4,977,471 | 12/1990 | Nigam | 360/77.08 |
| 5,126,895 | 6/1992 | Yasuda et al. | 360/77.07 |
| 5,177,651 | 1/1993 | Moraru et al. | 360/77.08 |

OTHER PUBLICATIONS

D. E. Griffiths et al, "Self-calibrating Disk Storage Apparatus", IBM Technical Disclosure Bulletin, vol. 19, No. 6, Nov. 1976.

*Primary Examiner*—Willis R. Wolfe

[57] ABSTRACT

A disk drive has a disk format that includes servo fields and interspersed data fields. The disk drive includes a timing generator for generating timing signals to synchronize and control operation of read/write and servo positioning circuits. The disk drive also includes a writable program store that stores a plurality of timing signal commands for generating timing signals in conformance with the format of a disk. A processor loads the writable program store with the timing signal commands and the processor further enables readout of those commands from the writable program store. An execution register receives the timing signal commands and generates timing signals in response, the timing signals controlling synchronization and operation of the read/write circuits. As the writable program store is reprogrammable, at will, substantial flexibility is achieved in the creation of such timing signals.

6 Claims, 4 Drawing Sheets

PROGRAMMABLE SERVO TIMING GENERATOR

FIELD OF THE INVENTION

This invention relates to disk drives and, more particularly, to apparatus for generating timing signals within a disk drive, which apparatus is programmable so as to enable its alteration in the event of a changed disk format.

BACKGROUND OF THE INVENTION

Present day disk drives employ a number of servo control techniques for controlling transducer positioning. Larger form-factor disk drives employ a dedicated servo surface on one disk platter to enable the generation of signals for servo control of head position. In such larger disk drives, this is a practical technique for servo generation since those drives contain multiple platters, yielding many surfaces. The dedication of one surface to servo signals subjects the disk drive to a "servo overhead" which is tolerable. For instance, in an eight platter drive, the "servo overhead", using a dedicated servo surface is only 6.25%.

Smaller form-factor disk drives (e.g. 3½" or smaller) generally contain one or two disks. In such a drive, if one surface of a disk is dedicated to servo information, the overhead can be as high as 50% which is unacceptable. To minimize the servo overhead in these smaller disk drives, servo information has been embedded into the data tracks and is distributed throughout the track. Since the servo and data fields are thereby contiguous, differentiation between them becomes critical to proper operation of the disk drive.

Before a disk drive can be operated to store data, the disks must be formatted. Such formatting involves the partitioning of each recording surface into a plurality of pie-shaped sectors, each sector including a single servo burst. Since each disk track has a different linear velocity from every other track on the disk, signals written at a constant frequency do not exhibit a constant data density from track to track. For instance, a servo burst written at a constant frequency in a sector of an inner track will occupy less linear distance on the inner track than a constant frequency servo burst written on a more radially distant outer track. Nevertheless, servo bursts are written using constant frequency signals across the tracks. In such a case, radially aligned servo bursts occupy different linear distances in their respective tracks, but radially aligned servo bursts occupy an identical time window in each track (the angular velocity of each track is identical). Thus, a timing signal generated to window a servo burst and various signal segments therein can be made the same for each track irrespective of the radial distance of the track from a disk's spindle axis.

If constant frequency recording is used for data, as it is for servo bursts, the density of data in outer tracks is much less than for data in inner tracks and the resultant storage efficiency of the disk drive suffers. Many hard-disk disk drives therefore employ a method of recording termed "constant density" recording. More specifically, data is written in each track (or in a zone of tracks) so that the signal density is nearly constant across all tracks and more specifically from recording zone to recording zone. As a result, the frequency of recording of such data in greater radius tracks is higher than the frequency of recording in the more radially-inner tracks. Notwithstanding that data in larger radius tracks is recorded at a lesser density than data in smaller radius tracks, servo bursts are still recorded at a constant frequency. This fact enables timing control generators (used in constant density recording disk drives) to generate a single set of timing windows for all servo signals, irrespective of which track is being accessed.

In prior art disk drives, servo synchronization and timing-window generation circuitry has generally been of the hard-wired variety. If, during development, or for subsequent engineering change purposes, the formats of the servo or data fields were changed, a new timing generator was constructed and substituted for the outdated version. Such redesign and substitution required a long lead time and was expensive.

Accordingly, it is an object of this invention to provide a disk drive with a servo timing generator that is readily alterable to accommodate changed track formats.

It is another object of this invention to provide a disk drive servo timing generator that is programmably alterable.

It is yet another object of this invention to provide a programmable servo timing generator that may be reconfigured either statically or on-the-fly.

SUMMARY OF THE INVENTION

A disk drive has a disk format that includes servo fields and interspersed data fields. The disk drive includes a timing generator for generating timing signals to synchronize and control operation of read/write and servo positioning circuits. The disk drive also includes a writable program store that stores a plurality of timing signal commands for generating timing signals in conformance with the format of a disk. A processor loads the writable program store with the timing signal commands and further enables readout of those commands from the writable program store. An execution register receives the timing signal commands and generates timing signals in response, the timing signals controlling synchronization and operation of the read/write circuits. As the writable program store is reprogrammable, at will, substantial flexibility is achieved in the creation of such timing signals.

DETAILED DESCRIPTION OF THE INVENTION

Figure 1:
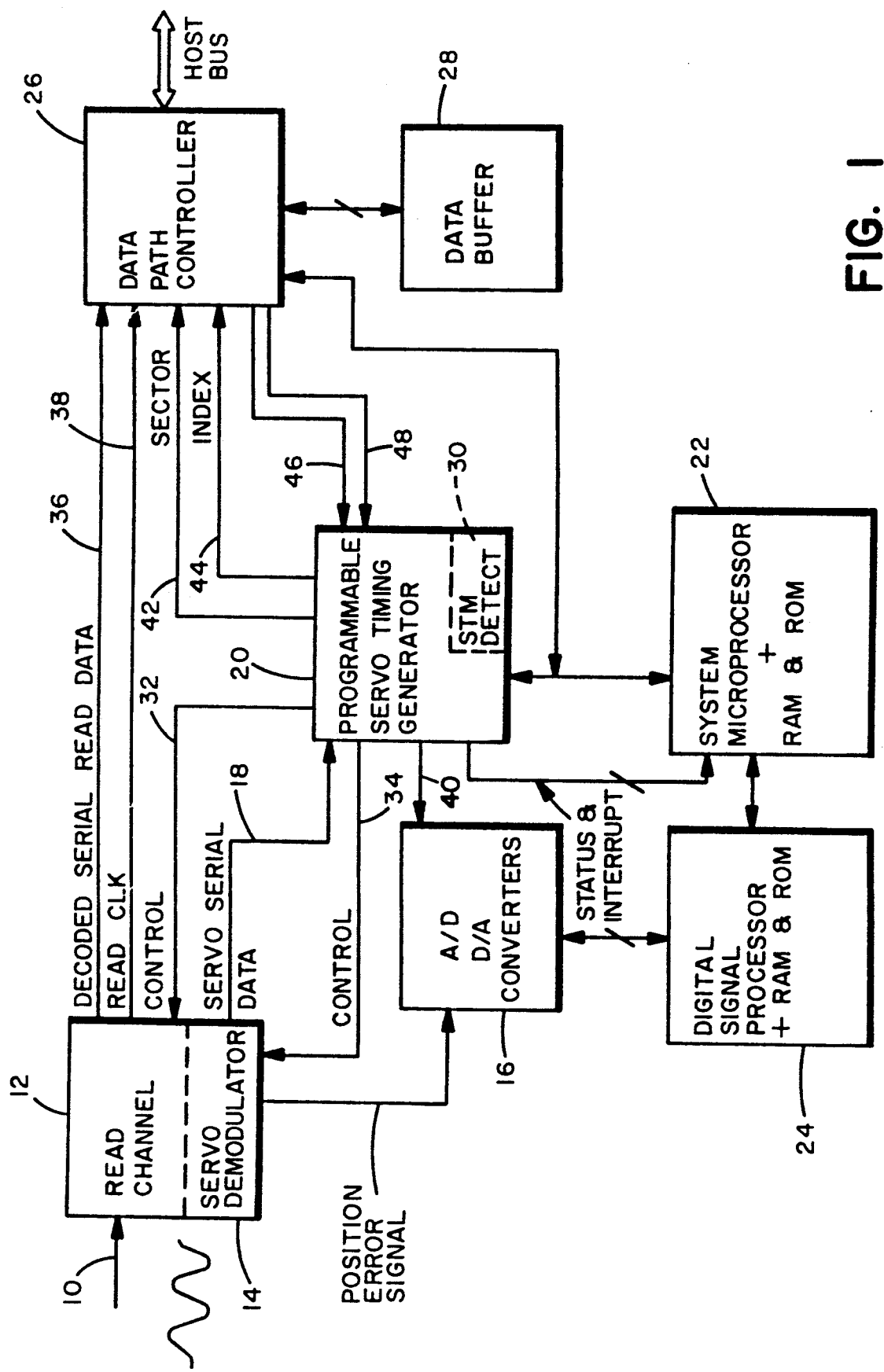
FIG. 1 is a block diagram of a portion of a disk drive system, illustrating the arrangement of a programmable servo timing generator and its relation to other subsystems within the disk drive.

Referring to FIG. 1, a block diagram illustrates a portion of the control circuitry for a hard-disk disk drive. A read/write head (not shown) detects analog data and emplaces it on line 10 to read channel 12. The signals sent to read channel 12 over line 10 include both embedded servo burst signals and data fields. Read channel 12 processes the analog signal read from the disk and converts it into digital data (line 36) and an associated clock (line 38). In addition, read channel 12 includes a servo demodulator 14 which, upon command, demodulates servo burst signals that are detected on line 10 and feeds a position error signal to analogue to digital (A/D), digital to analogue (D/A) converters 16. The serial servo burst data 18 may be derived by level detecting the analog signal from the head, or other means, such as peak detection of the analog signal peaks. The servo burst information 18 consists of digital pulses, whose time spacing is used by servo timing generator 20 to synchronize itself with the servo bursts. The operation of servo timing generator 20 is controlled by a program that is loaded from system microprocessor 22. Microprocessor 22 further controls a digital signal processor 24 that, in turn, controls the operation of A/D, D/A convertors 16.

Programmable servo timing generator 20 forms the synchronization heart of the system shown in FIG. 1. It provides outputs to each of the illustrated modules, including data path controller 26 to enable synchronization of the operation of each with the incoming analog signals. In brief, programmable servo timing generator 20, upon receiving a series of signals over line 18 from read channel 12 and, upon being instructed to commence a read cycle by microprocessor 22, begins by looking for a sector timing mark (STM). The STM is detected by a match in an STM detect circuit 30, within programmable servo timing generator 20. Upon such detection, programmable servo timing generator 20 is triggered to issue a set of synchronized servo and read/write timing signals. Microprocessor 22 controls data transactions associated with control of the read/write mechanism. Spindle speed is regulated by control signals from servo timing generator 20.

As above indicated, programmable servo timing generator 20 now begins to issue timing commands that enable the generation of timing signals and windows. For instance, the identification of an STM causes generation of timing windows over control lines 32 and 34 to read channel 12 and servo demodulator 14, respectively. The timing Window sent via control line 32 gates read channel 12 during the data portion of a track and causes transfer of data signals, via line 36, to data path controller 26. In addition, read channel 12 generates a synchronized data clock signal (read clk) which is fed via line 38 to data path controller 26.

A timing window is fed via line 34 to servo demodulator module 14 and enables fine servo control fields to be windowed and then transferred to A/D, D/A converters 16 for subsequent passage to digital signal processor 24. Programmable servo timing generator 20 also generates a "start of conversion" window timing signal on line 40 to enable the action of A/D, D/A converters 16. Programmable servo timing generator 20 further generates sector and index synchronizing pulses and provides them over lines 42 and 44, respectively, to data path controller 26. The sector pulse on line 42 indicates the beginning of a sector within a track. The index pulse on line 44 indicates the beginning of a track. Lines 46 and 48, emanating from data path controller 26, instruct programmable servo timing generator 20 as to whether the system is in a read or write state.

Figure 2:
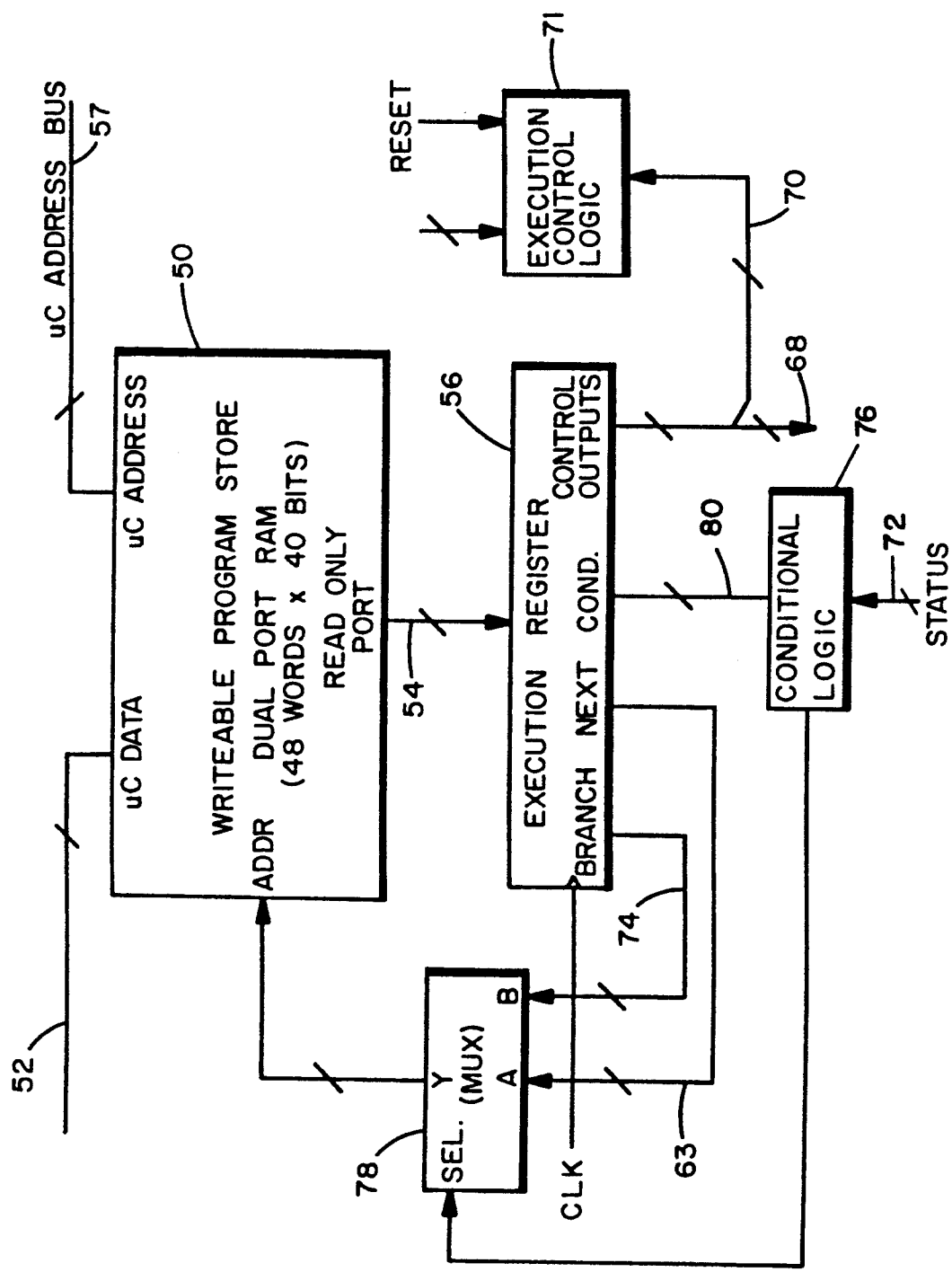
FIG. 2 illustrates a block diagram of a writable program store and associated circuitry that enables alteration of timing signal generation within the programmable servo timing generator shown in FIG. 1.

Referring to FIG. 2, the core of programmable servo timing generator 20 is a writable program store 50. Store 50 includes 48, 40-bit words, each word establishing a machine "state" that enables one or more timing signals or windows to be generated. While writable program store 50 will be described in the 48 by 40 word embodiment, those skilled in the art will understand that its size can be altered to readily fit any word format.

Writable program store 50 is loaded from system microprocessor 22 via bus 52. Writable program store 50 is dual ported and includes a read only port 54 where individual words are read out to an execution register 56. Individual words in store 50 are addressed by addresses appearing on address bus 56 from microprocessor 22.

Each 40 bit word within writable program store 50 includes four fields to enable the performance of specific functions. Each word has the following structure:

| Bits  | Function |
|-------|----------|
| 0–9   | used as control outputs for circuitry that is external to programmable servo timing generator 20. |
| 10–17 | used to provide timed control levels for circuitry internal to programmable servo timing generator 20. |
| 18–23 | indicate the next address value within writable program store 50. |
| 24–39 | indicate a count field value which may be counted down to provide a timing function. Bits 32–39 may, in the alternative, be used for a branch address value (upon condition). |

Figure 3:
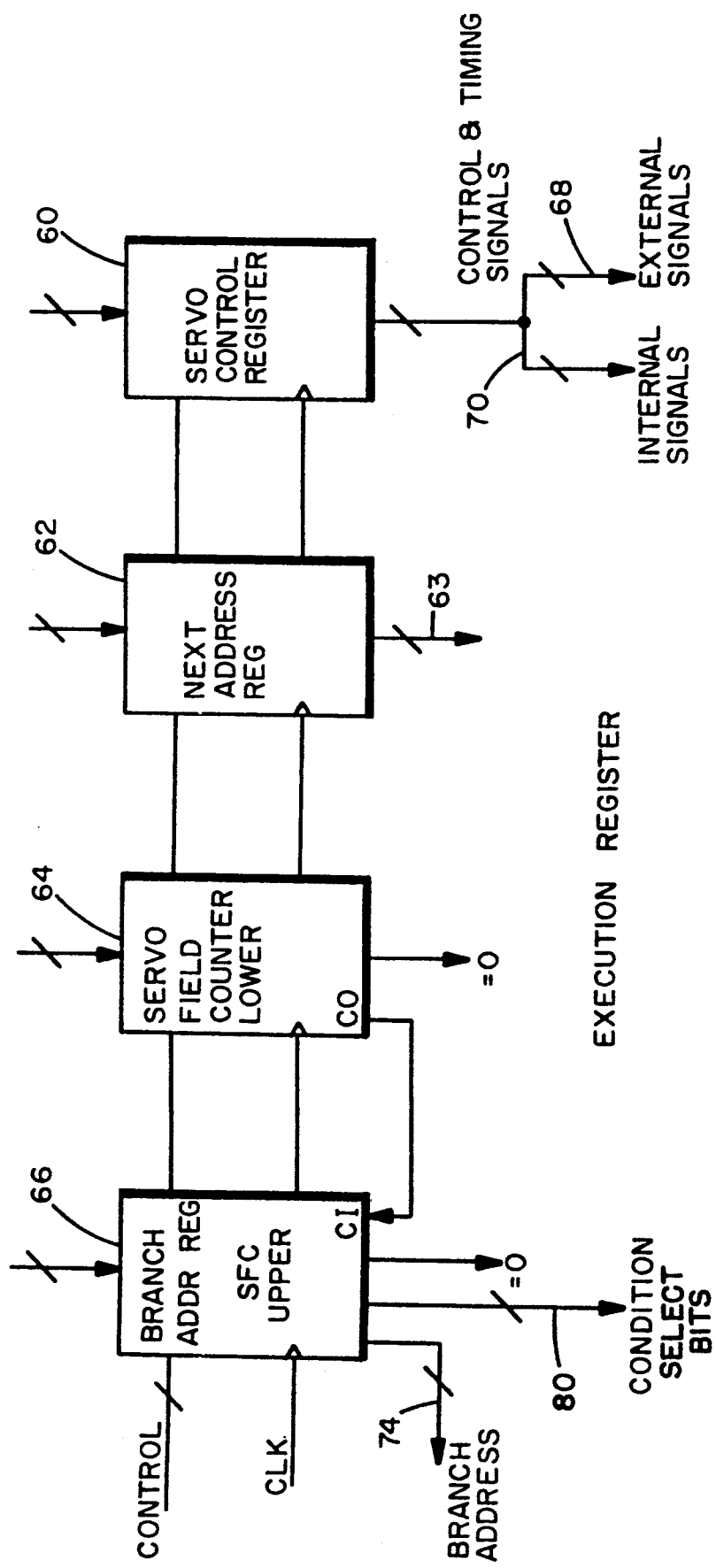
FIG. 3 is a more detailed block diagram of the execution register shown in FIG. 2.

When a word is read from writable program store 50 and into execution register 56, the above-noted bit groups are segmented and fed into individual sub-modules within execution register 56 to enable the generation of window and timing control signals. Details of execution register 56 are shown in FIG. 3 where it can be seen that execution register 56 comprises four sub-modules, to wit: servo control register 60, next address register 62, servo field counter (lower) 64 and branch address register/servo field counter (upper) 66.

Servo control register 60 receives bits 0–17 of a word (read from writable program store 50) and manifests outputs in accord with bits 0–9 on bus 68 and outputs in accord with bits 10–17 on bus 70. The output levels on bus 68 are fed to other circuits for external control purposes. The outputs on bus 70 are fed to execution control logic module 7 which responds by generating control or timed window signals for modules within programmable servo timing generator 20. Examples of specifically generated timing signals and windows will be described in relation to FIG. 4, below.

Next address register 62 receives bits 18–23 from writable program store 50 and indicates the address of the next word within writable program store 50 that is to be accessed (unless a branch occurs). Servo field counters 64 and 66 are set to a count value by bits 24–39 from a word read from writable program store 50. A clock signal applied to counters 64 and 66 causes them to increment downwardly from the count value until value 0 is reached. Counters 64, 66 thus control the time of action of a word read from writable program store 50.

Servo field counter 66 may, in the alternative, be used as a branch address register which, upon the occurrence of a selected condition that is manifested on status bus 72, causes a branch address to be read out via bus 74 that is used in lieu of the address contained in next address register 62. As shown in FIG. 2, condition select bus 80 feeds into a conditional logic module 76 which, upon occurrence of the selected status condition 72, sets multiplexer 78 to provide the branch address appearing on bus 74 in lieu of the next address appearing on bus 63.

Figure 4:
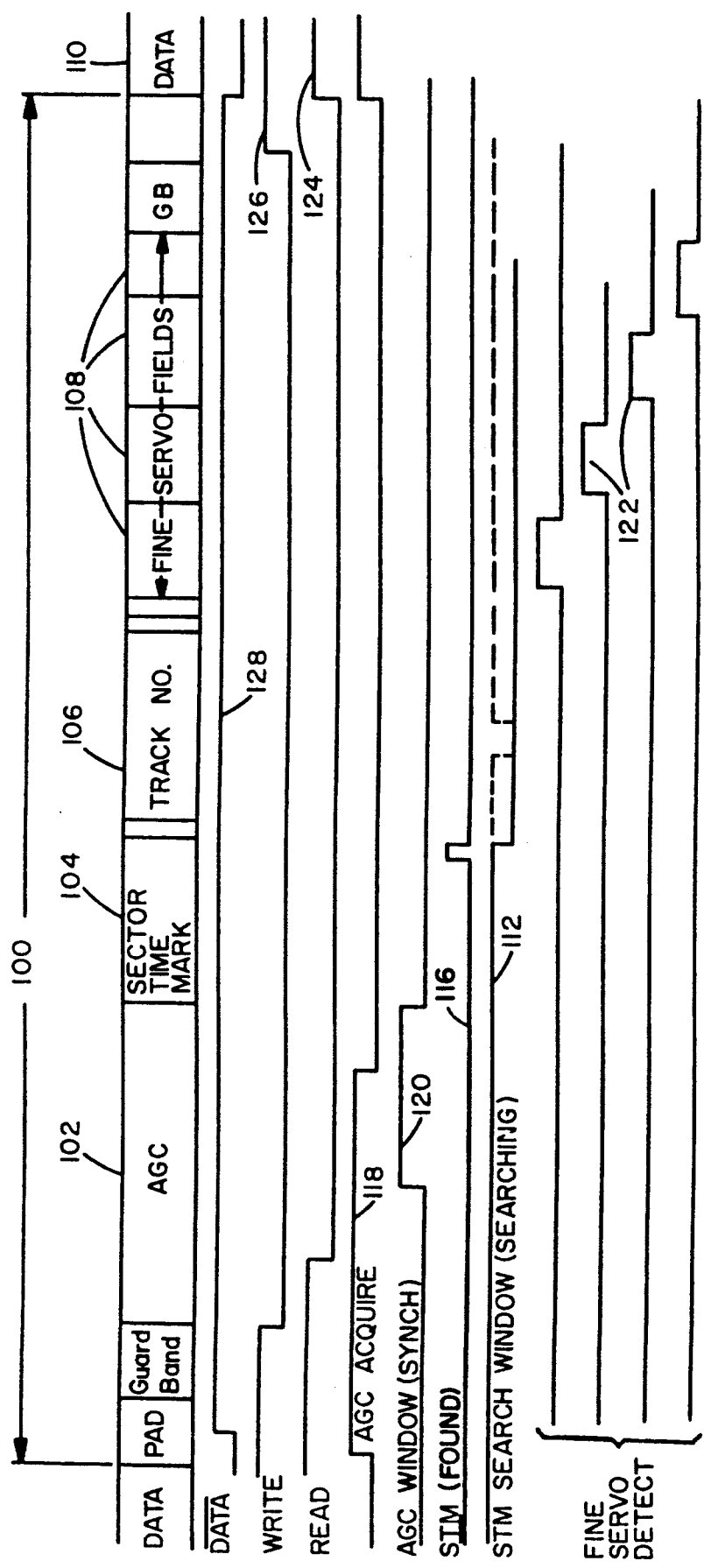
FIG. 4 is a representative waveform diagram showing timing waveforms generated by the execution register of FIG. 3.

Turning to FIG. 4, the operation of programmable servo timing generator 20 will be described. At the top of FIG. 4 is illustrated an exemplary embedded servo burst track format to be found in the disk drive. The servo burst duration is denoted by 100 and includes a plurality of segments. Those segments include a series of transitions employed for automatic gain control (102); a sector timing mark 104 that is a predetermined servo code pattern written at manufacturing time; an indication of track number (106) that is written in gray code; a plurality of fine servo control fields 108 and a data field 110 that has at its lead portion, a header (not shown).

For the following discussion, it will be assumed that the disk drive is already up to speed and that a read/write head has been moved to a designated track. At such time, read channel 12 accepts data from the read/write head. Simultaneously, a first word is read from writable program store 50 into execution register 56. In response, servo control register 60 manifests a signal that causes the establishment of an "STM search window (searching)" waveform 112 (see FIG. 4). This long-term level gates open a line to STM detect circuit 30 (FIG. 1) which compares the incoming data to a pre-established sector time mark stored in STM detect circuit 30.

Upon finding a match, a signal 116 is generated by STM detect circuit 30 that sets a reference time for servo timing generator 20. A next word is then loaded from writable program store 50 into execution register 56.

The sequence of words read from writable program store 50 into execution register 56 may be selected in accordance with the particular control features required by the disk drive, at each particular moment. Thus, an "AGC acquire window" 118 may be enabled, to be replaced by a shorter "AGC window (synch)" 120 which is enabled once timing is known and a locked mode has been established. The time during which each command is active is controlled by the countdown time in servo field counters 64 and/or 66.

Other exemplary timing waveforms and windows generated by programmable timing servo generator 20 (in response to words read from writable program store 50) are fine servo detect windows 122, read and write enable windows 124 and 126 and not data window 128. Each of those timing windows is utilized to enable read/write circuitry and servo control circuitry to perform their respective functions at the proper times, during read/write actions.

As can be seen from the above, any change in track format, whether it be to the servo timing burst or to the data portions of a track can be accommodated by a change in word structures loaded into writable program store 50. Thus, the entire timing system can be readily reconfigured by simply inserting changed words into system microprocessor 22 and loading the words into writable program store 50. As a result, design changes (before equipment introduction) and field changes can be readily implemented without requiring the redesign and installation of entirely new circuit chips.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A disk drive system having prerecorded track format signal patterns including servo bursts with servo timing marks and interspersed data fields, said disk drive having data read/write circuits and timing generation means for generating timing signals, said disk drive comprising:

writable program storage means for storing a plurality of alterable timing signal commands;

disk drive processor means for loading said writable program storage means with a series of commands for generating timing signals in response to signals sensed from said prerecorded servo format signal patterns, said processor means causing read-out of said commands from said writable program storage means in response to said prerecorded track format signal patterns; and execution register means for receiving said read-out commands and for generating timing signals in response to said commands, said timing signals controlling synchronization and operation of said data read/write circuits.

2. The disk drive as recited in claim 1, wherein host processor means is provided to alter said commands in response to a change of the prerecorded disk track format signal patterns, said altered commands, when loaded into said writable program storage means by said disk drive processor means, enabling generation of timing signals in conformance with said changed disk track format signal patterns.

3. The disk drive system as recited in claim 2 wherein said disk drive processor means causes a first command to be read-out from said writable program storage means to enable a search for a servo timing mark, and further comprising:

detector means responsive to said first command for detecting a servo timing mark from said read/write circuits and for generating an interrupt to act as a master timing signal.

4. The disk drive as recited in claim 2, wherein each servo burst in each data track of said disk drive is written at a constant data frequency, thereby enabling said timing signal commands in said writable program storage means to be employed for servo bursts in all said data tracks.

5. The disk drive system as recited in claim 2 wherein said execution register means includes a servo control register, responsive to a read-out command, to generate control and timing signals both for said timing generation means and for said read/write circuits.

6. The disk drive as recited in claim 5 wherein said execution register means includes a counter means for generating a timed count in response to signals from a portion of a read-out command, said timed count controlling the time of action of said command.

* * * * *